US012596102B2

(12) United States Patent
Webster

(10) Patent No.: US 12,596,102 B2
(45) Date of Patent: Apr. 7, 2026

(54) RESONATOR STRUCTURE FOR MASS SENSING

(71) Applicant: Qorvo US, Inc., Greensboro, NC (US)

(72) Inventor: James Webster, Minnetonka, MN (US)

(73) Assignee: Qorvo US, Inc., Greensboro, NC (US)

( * ) Notice: Subject to any disclaimer, the term of this patent is extended or adjusted under 35 U.S.C. 154(b) by 469 days.

(21) Appl. No.: 17/787,198

(22) PCT Filed: Dec. 18, 2020

(86) PCT No.: PCT/US2020/066146
§ 371 (c)(1),
(2) Date: Jun. 17, 2022

(87) PCT Pub. No.: WO2021/127521
PCT Pub. Date: Jun. 24, 2021

(65) Prior Publication Data
US 2023/0023769 A1     Jan. 26, 2023

Related U.S. Application Data

(60) Provisional application No. 62/950,445, filed on Dec. 19, 2019.

(51) Int. Cl.
*G01N 29/036*     (2006.01)
*B06B 1/02*     (2006.01)
(Continued)

(52) U.S. Cl.
CPC ......... *G01N 29/036* (2013.01); *B06B 1/0681* (2013.01); *G01N 29/022* (2013.01);
(Continued)

(58) Field of Classification Search
CPC .. B06B 1/0681; B06B 1/0261; G01N 29/036; G01N 29/022; G01N 29/2437;
(Continued)

(56) References Cited

U.S. PATENT DOCUMENTS

| | | | |
|---|---|---|---|
| 5,932,953 A | 8/1999 | Drees et al. | |
| 5,936,150 A * | 8/1999 | Kobrin | ..................... G01N 5/02 |
| | | | 73/24.06 |

(Continued)

FOREIGN PATENT DOCUMENTS

| | | |
|---|---|---|
| CN | 108463720 A | 8/2018 |
| WO | 2005/034348 A1 | 4/2005 |

(Continued)

OTHER PUBLICATIONS

Hirofumi Kanbara et al. Analysis of Piezoelectric Thin Film Resonators with Acoustic Quarter-Wave Multilayers. 2000 Jpn. J. Appl. Phys. 39 3049 (Year: 2000).*

(Continued)

*Primary Examiner* — Laura Martin
*Assistant Examiner* — Mark A Shabman
(74) *Attorney, Agent, or Firm* — Haynes and Boone, LLP

(57) ABSTRACT

A solid mount resonator sensor has a substrate. An anti-reflector stack is disposed proximate the substrate. The anti-reflector stack includes one or more acoustic interference layers. A first electrode is disposed proximate the anti-reflector stack. A second electrode having a first surface facing towards the first electrode and an opposing second surface facing away from the first electrode. A substantially quarter-wave piezoelectric material layer is disposed between the first and second electrodes.

22 Claims, 7 Drawing Sheets

(51) Int. Cl.
  *B06B 1/06* (2006.01)
  *G01N 29/02* (2006.01)
  *G01N 29/24* (2006.01)
(52) U.S. Cl.
  CPC ........ *G01N 29/2437* (2013.01); *B06B 1/0261* (2013.01); *G01N 2291/02466* (2013.01); *G01N 2291/0256* (2013.01); *G01N 2291/02809* (2013.01); *G01N 2291/0426* (2013.01)
(58) Field of Classification Search
  CPC . G01N 2291/02466; G01N 2291/0256; G01N 2291/02809
  USPC .......................................................... 73/579
  See application file for complete search history.

(56) References Cited

U.S. PATENT DOCUMENTS

| | | | | |
|---|---|---|---|---|
| 8,035,464 | B1 * | 10/2011 | Abbott .............. | H03H 9/02559 |
| | | | | 333/194 |
| 10,326,425 | B2 * | 6/2019 | Belsick ............. | H03H 9/02086 |
| 10,578,614 | B2 * | 3/2020 | Murdock ............ | G01N 29/022 |
| 2002/0093394 | A1 | 7/2002 | Tikka et al. | |
| 2005/0134147 | A1 | 6/2005 | Nakamura et al. | |
| 2008/0247264 | A1 | 10/2008 | Gabl et al. | |
| 2017/0093368 | A1 * | 3/2017 | Choy ...................... | H03H 9/54 |
| 2017/0122936 | A1 * | 5/2017 | Rivas ................... | G01N 29/036 |
| 2017/0134001 | A1 * | 5/2017 | Belsick ................ | G01N 29/022 |
| 2017/0168018 | A1 | 6/2017 | Morton et al. | |
| 2018/0109242 | A1 | 4/2018 | Solal et al. | |
| 2019/0137449 | A1 * | 5/2019 | Webster .............. | G01N 33/557 |
| 2020/0011835 | A1 * | 1/2020 | Webster .............. | G01N 29/036 |
| 2020/0266796 | A1 * | 8/2020 | Matsuda ........... | H03H 9/02842 |

FOREIGN PATENT DOCUMENTS

| | | | | | |
|---|---|---|---|---|---|
| WO | WO-2017189512 | A1 * | 11/2017 | .............. | G01H 1/06 |
| WO | WO-2018106814 | A1 * | 6/2018 | ............. | G01N 29/02 |

OTHER PUBLICATIONS

International Search Report and Written Opinion mailed Mar. 24, 2021 in International Application No. PCT/US2020/066146, 9 pages.

Rosenbaum, "Bulk Acoustic Wave Theory and Devices," 1988, pp. 184-195; pp. 372-377.

Ballantine, et al. "Acoustic Wave Sensors," 1997, pp. 36-45.

International Preliminary Report on Patentability mailed May 17, 2022 in International Application No. PCT/US2020/066146, 8 pages.

Office Action dated Jan. 22, 2025 from Chinese application No. 202080085596.3, 9 pages.

* cited by examiner

RESONATOR STRUCTURE FOR MASS SENSING

CROSS-REFERENCE TO RELATED APPLICATION

The present application is a U.S. National Stage patent application of International Patent Application No. PCT/US2020/066146, filed on Dec. 18, 2020, which claims the benefit of U.S. Provisional Application No. 62/950,445 filed Dec. 19, 2019, the benefit of which is claimed and the disclosures of which are incorporated herein by reference their entirety.

TECHNICAL FIELD

The present disclosure relates to acoustic resonators, including acoustic resonators suitable for biosensing or biochemical sensing applications.

BACKGROUND

Piezoelectric devices such as thin film bulk acoustic wave (BAW) resonators and similar technologies like quartz crystal microbalances (QCM) have been employed as mass detectors for some time. One application of piezoelectric resonators is in detecting very small quantities of materials. A piezoelectric resonator is typically constructed as a thin, planar layer of crystalline or polycrystalline piezoelectric material sandwiched between two electrode layers. When used as a sensor, the resonator is exposed to the material being detected to allow the material to bind on a surface of the resonator.

The material to be detected is often an analyte. A binding partner (e.g., an antibody, etc.) that selectively binds the analyte may be immobilized relative to a surface of the resonator. When the analyte is contacted with the surface of the resonator, the mass on the surface increases. The changed mass results in changes to the resonance phase, frequency, etc., of the resonator.

One conventional way of detecting the amount of the material bound on the surface of a sensing resonator is to operate the resonator at its resonant frequency in an oscillator circuit. As the material being detected binds on the resonator surface, the oscillation frequency of the resonator is reduced. The change in the oscillation frequency of the resonator, presumably caused by the binding of the material on the resonator surface, is measured and used to calculate the amount of the material bound on the resonator or the rate at which the material accumulates on the resonator surface.

In the case of a piezoelectric crystal resonator, an acoustic wave may embody a BAW propagating through the interior (or "bulk") of a substrate, or a surface acoustic wave (SAW) propagating on the surface of the substrate. SAW devices involve transduction of acoustic waves (commonly including two-dimensional Rayleigh waves) utilizing interdigital transducers along the surface of a piezoelectric material, with the waves being confined to a penetration depth of about one wavelength. BAW devices typically involve transduction of an acoustic wave using electrodes arranged on opposing top and bottom surfaces of a piezoelectric material. In a BAW device, three wave modes can propagate, namely, one longitudinal mode (embodying longitudinal waves, also called compressional/extensional waves, and two shear modes (embodying shear waves, also called transverse waves), with longitudinal and shear modes respectively identifying vibrations where particle motion is parallel to or perpendicular to the direction of wave propagation. The longitudinal mode is characterized by compression and elongation in the direction of the propagation, whereas the shear modes consist of motion perpendicular to the direction of propagation with no local change of volume. Longitudinal and shear modes propagate at different velocities. In practice, these modes are not necessarily pure modes, as the particle vibration, or polarization, is neither purely parallel nor purely perpendicular to the propagation direction. The propagation characteristics of the respective modes depend on the material properties and propagation direction respective to the crystal axis orientations. Since shear waves exhibit a very low penetration depth into a liquid, a device with pure or predominant shear modes can operate in liquids without significant radiation losses (in contrast with longitudinal waves, which can be radiated in liquid and exhibit significant propagation losses). The ability to create shear displacements is beneficial for operation of acoustic wave devices with fluids (e.g., liquids) because shear waves do not impart significant energy into fluids.

Certain piezoelectric thin films are capable of exciting both longitudinal and shear mode resonance, such as hexagonal crystal structure piezoelectric materials including (but not limited to) aluminum nitride [AlN] and zinc oxide [ZnO]. To excite a wave including a shear mode using a piezoelectric material arranged between electrodes, a polarization axis in a piezoelectric thin film must generally be non-perpendicular to (e.g., tilted relative to) the film plane. In biological sensing applications involving liquid media, the shear component of the resonator is used. In such applications, piezoelectric material may be grown with a c-axis orientation distribution that is non-perpendicular relative to a face of an underlying substrate to enable a BAW resonator structure to exhibit a dominant shear response upon application of an alternating current signal across electrodes thereof. Conversely, a piezoelectric material grown with a c-axis orientation that is perpendicular relative to a face of an underlying substrate will enable a BAW resonator structure to exhibit a dominant longitudinal response upon application of an alternating current signal across electrodes thereof.

SUMMARY

Embodiments described herein involve a solid mount resonator sensor, comprising a substrate. An anti-reflector stack is disposed proximate the substrate. The anti-reflector stack comprises one or more acoustic interference layers. A first electrode is disposed proximate the anti-reflector stack. A second electrode having a first surface facing towards the first electrode and an opposing second surface facing away from the first electrode. A substantially quarter-wave piezoelectric material layer is disposed between the first and second electrodes.

Embodiments involve a resonator sensor system comprising a solid-mount resonator comprising a substrate. An anti-reflector stack disposed proximate the substrate. The anti-reflector stack comprises one or more acoustic interference layers. A first electrode is disposed proximate the anti-reflector stack. A second electrode has a first surface facing towards the first electrode layer and an opposing second surface facing away from the first electrode layer. A substantially quarter-wave piezoelectric material layer is disposed between the first and second electrodes. Actuation circuitry configured to drive the solid-mount resonator into an oscillating motion. Measurement circuitry is configured to measure one or more resonator output signals representing a resonance characteristic of the oscillating motion of the solid-mount resonator. A controller is operatively coupled to the actuation and measurement circuitry.

Embodiments involve a solid mount resonator sensor, comprising a substrate, An anti-reflector stack disposed proximate the substrate. The anti-reflector stack comprises one or more acoustic interference layers and a first electrode. A second electrode has a first surface facing towards the first electrode and an opposing second surface facing away from the first electrode. A substantially quarter-wave piezoelectric material layer is disposed between the first and second electrodes.

Figure 1:
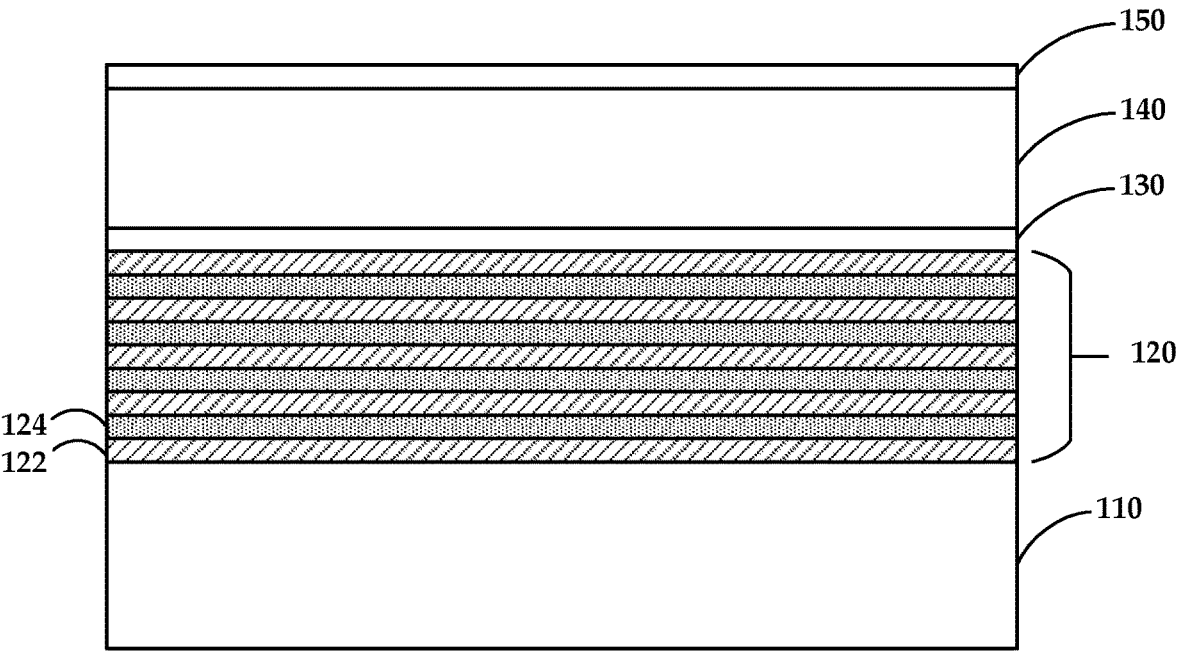
FIG. 1 is a schematic cross-sectional view of a portion of resonator device 100 useable with embodiments disclosed herein.

The schematic drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

This disclosure generally relates to, among other things, methods, devices, sensors, and systems for detecting an analyte. The methods, devices, sensors, and systems use a thin film bulk acoustic wave (BAW) resonator that measures a change in frequency or phase of the resonator caused by the binding of the analyte on a surface of the resonator. An input electrical signal having a phase and having a frequency within a resonance band of the piezoelectric resonator, which in the case of some embodiments of the present disclosure may be about 500 MHz or greater, such as about 1.5 GHz or greater, is coupled to and transmitted through the resonator to generate an output electrical signal which is frequency-shifted or phase-shifted from the input signal due to binding, deposition, etc. of material being detected on the resonator surface. The output electrical signal received from the piezoelectric resonator is analyzed to determine the change in frequency or phase caused by the binding of analyte on the resonator surface. The measured change in frequency or phase provides quantitative information regarding the analyte (or tag-linked analyte molecule) bound to the resonator surface.

The sensors disclosed herein may include at least one thin film resonator sensor, such as a thin film bulk acoustic wave (BAW) resonator sensor. A BAW sensor includes a piezoelectric layer, or piezoelectric substrate, and input and output transducers. BAW sensors are small sensors, making the technology suitable for use in handheld devices. Accordingly, a handheld device for detecting target analytes comprising a sensor described herein is contemplated.

According to embodiments described herein, the resonator typically includes a planar layer of piezoelectric material bounded on opposite sides by two respective metal layers that form the electrodes of the resonator. The two surfaces of the resonator are free to undergo vibrational movement when the resonator is driven by a signal within the resonance band of the resonator. When the resonator is used as a sensor, at least one of its surfaces is adapted to provide binding sites for the material being detected. The binding of the material on the surface of the resonator alters the resonant characteristics of the resonator, and the changes in the resonant characteristics are detected and interpreted to provide quantitative information regarding the material being detected.

By way of example, such quantitative information may be obtained by detecting a change in the insertion or reflection coefficient phase shift of the resonator caused by the binding of the material being detected on the surface of the resonator. Such sensors differ from those that operate the resonator as an oscillator and monitor changes in the oscillation frequency. Rather such sensors insert the resonator in the path of a signal of a pre-selected frequency and monitor the variation of the insertion or reflection coefficient phase shift caused by the binding of the material being detected on the resonator surface. Of course, sensors that monitor changes in oscillation frequency may also be employed in accordance with the methods described herein.

FIG. 1 is a schematic cross-sectional view of a portion of resonator device 100 useable with embodiments disclosed herein. The resonator device 100 includes a substrate 110 (e.g., typically silicon or another semiconductor material), an acoustic anti-reflector 120 arranged over the substrate 110, a piezoelectric material 140, and first 130 and second 150 electrodes. According to various embodiments, the piezoelectric material 140 is substantially a quarter-wave piezoelectric material. It is to be understood that the first and second electrodes may be referred to herein as bottom and top side electrodes, respectively. The first electrode 130 is arranged along a portion of a lower surface 142 of the piezoelectric material 140 (between the anti-reflector 120 and the piezoelectric material 140), and the second electrode 150 is arranged along a portion of an upper surface 144 of the piezoelectric material 140. Although FIG. 1 shows the first electrode 130 distinct from the anti-reflector stack 120, it is to be understood that in various configurations, the first electrode is incorporated into the anti-reflector stack. An area in which the piezoelectric material 140 is arranged between overlapping portions of the first electrode 130 and the second electrode 150 may be considered an active region of the resonator device 100. The acoustic anti-reflector 120 causes substantially no dampening at the fundamental frequency. According to embodiments described herein, the anti-reflector causes little or no acoustic energy to be delivered to the non-sensing side of the resonator.

In certain embodiments, the anti-reflector 120 includes alternating acoustic interference layers 122, 124 of materials having different acoustic impedance values, optionally embodied in a quarter-wave Bragg mirror, deposited over the substrate 110. In certain embodiments, other types of acoustic reflectors may be used. Steps for forming the resonator device 100 may include depositing the anti-reflector 120 over the substrate 110, followed by deposition of the first electrode 130, followed by growth (e.g., via sputtering or other appropriate methods) of the piezoelectric material 140, followed by deposition of the second electrode 150.

The resonator device 100 shown in FIG. 1 lacks any layers (e.g., including functionalization material) overlying the active region that would permit the resonator device 100 to be used as a biochemical sensor. If desired, at least portions of the resonator device 100 shown in FIG. 1 may be overlaid with various layers, such as one or more of: a hermeticity layer, an interface layer, a self-assembled mono-layer (SAM), and/or a functionalization material (which may include specific binding material or non-specific bind-ing material).

For example, sensor apparatuses may include (i) a sensing resonator including binding sites for an analyte; (ii) actua-tion circuitry configured to drive the sensing resonator in an oscillating motion; (iii) measurement circuitry arranged to be coupled to the sensing resonator and configured to measure one or more resonator output signals representing resonance characteristics of the oscillating motion of the sensing resonator; and (iv) a controller operatively coupled with the actuation and measurement circuitry. The controller can be interfaced with data storage containing instructions that, when executed, cause the controller to adjust the frequency at which the actuation circuitry drives the sensing resonator to maintain a resonance point of the sensing resonator. Accordingly, sensing may be accomplished by actuating the sensor into an oscillating motion; measuring one or more resonator output signals representing resonance characteristics of the oscillating motion of the sensor; and adjusting the actuation frequency of the sensing resonator to maintain a resonance point of the BAW sensor.

In various embodiments, sensors for use with the meth-ods, devices, and system described herein have resonance frequencies of about 500 MHz or greater, such as about 700 MHz or greater, about 900 MHz or greater, about 1 MHz or greater, about 1.5 GHz or greater, about 1.8 GH or greater, about 2 GHz or greater, about 2.2 GHz or greater, about 2.5 GHz or greater, about 3 GHZ or greater, or about 5 GHZ or greater can provide enhanced sensitivity. In embodiments, the sensors have resonance frequencies of from about 500 MHz to about 5 GHz, such as from about 900 MHz to about 3 GHz, or from about 1.5 GHz to about 2.5 GHz. In some cases, the operating frequency of the device is in a range of about 2 GHz to about 10 GHz. Some of such frequencies are substantially higher than frequencies of previously described piezoelectric resonators.

The sensing resonators described herein are thin-film resonators. Thin film resonators (TFR) include a thin layer of piezoelectric material deposited on a substrate, rather than using, for example, AT-cut quartz. The piezoelectric films typically have a thickness of less than about 5 micrometers, such as less than about 2 micrometers, and may have thicknesses of less than about 100 nanometers. Thin-film resonators are generally preferred because of their high resonance frequencies and the theoretically higher sensitivi-ties. Depending on the applications, a thin-film resonator used as the sensing element may be formed to support either longitudinal or shear bulk-acoustic wave resonant modes. Preferably, the sensing element is formed to support shear bulk-acoustic wave resonant modes, as they are more suit-able for use in a liquid sample.

Additional details regarding sensor devices and systems that may employ TFRs are described in, for example, U.S. Pat. No. 5,932,953 issued Aug. 3, 1999 to Drees et al., which patent is hereby incorporated herein by reference in its entirety to the extent that it does not conflict with the disclosure presented herein.

TFR sensors may be made in any suitable manner and of any suitable material. By way of example, a resonator may include a substrate such as a silicon wafer or sapphire, a Bragg mirror layer or other suitable acoustic isolation means, a bottom electrode, a piezoelectric material, and a top electrode.

Any suitable piezoelectric material may be used in a TFR. Examples of suitable piezoelectric substrates include lithium tantalate ($LiTaO_3$), lithium niobate ($LiNbO_3$), Zinc Oxide (ZnO), aluminum nitride (AlN), plumbum zirconate titanate (PZT) and the like.

Electrodes may be formed of any suitable material, such as aluminum, tungsten, gold, titanium, molybdenum, or the like. Electrodes may be deposited by vapor deposition or may be formed by any other suitable process.

Any suitable device or system may employ a thin film resonator as described herein. By way of example and with reference to FIG. 2, a system or apparatus for detecting an analyte may include a container 210 (or more than one container), the thin film resonator 220, actuation circuitry 222, measurement circuitry 229, and control electronics or a controller 230. A fluid path couples the one or more con-tainers 210 to the resonator 220. The control electronics 230 are operably coupled to the actuation circuitry 222 and the measurement circuitry 229. In embodiments, control elec-tronics 230 are configured to modify the frequency at which the actuation circuitry 222 oscillates the resonator 220 based on input from the measurement circuitry 229.

Any suitable control electronics or controller 230 may be employed. For example, control electronics may include a processor, controller, memory, or the like. Memory may include computer-readable instructions that, when executed by processor or controller cause the device and control electronics to perform various functions attributed to device and control electronics described herein. Memory may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Control electronics 230 may include any one or more of a microprocessor, a controller, a digital signal processor (DSP), an application specific integrated circuit (ASIC), a field-programmable gate array (FPGA), or equivalent dis-crete or integrated logic circuitry. In some examples, control electronics 230 may include multiple components, such as any combination of one or more microprocessors, one or more controllers, one or more DSPs, one or more ASICs, or one or more FPGAs, as well as other discrete or integrated logic circuitry. The functions attributed to control electronics herein may be embodied as software, firmware, hardware or any combination thereof.

According to various embodiments described herein the resonator is a solid mounted resonator (SMR) used as a mass sensor. Some early mass sensor devices such as quartz crystal microbalances (QCM) and similar structures are constructed by sandwiching a bulk piezoelectric material between two thin metal electrodes. The fundamental reso-nance frequency is such that the piezoelectric thickness represents about a half-period of the acoustic wave (a half-wave resonant device). Technically sensing can happen on both sides of the device but typically only one side of the device is used as a sensing surface. Solid mounted resona-tors typically follow a similar methodology in that the reflector provides and air-like acoustic interface on bottom side electrode and the device is designed as a half-wave resonator. As electrode loading becomes significant, the device, in-fact, may not be able to hold a half-period within the piezo material, but since both electrodes are "free" to move, it will still be referred to a half-wave resonant device for the purpose of this disclosure. When only using one sensing surface, all half-wave resonant devices (either QCM, SMR, or TFBAR) waste acoustic energy moving the non-sensing side of the device. Frequency shifts in bulk acoustic resonators, however, are ratio-metric (when loads are <2% total mass). Therefore, the frequency shift as a percent of the unloaded resonance frequency is substantially equivalent to the percent of loaded mass compared with the unloaded vibrating mass as illustrated by (1).

$$\frac{\Delta f}{f_0} = \frac{\Delta m}{m_0} \tag{1}$$

Figure 3A:
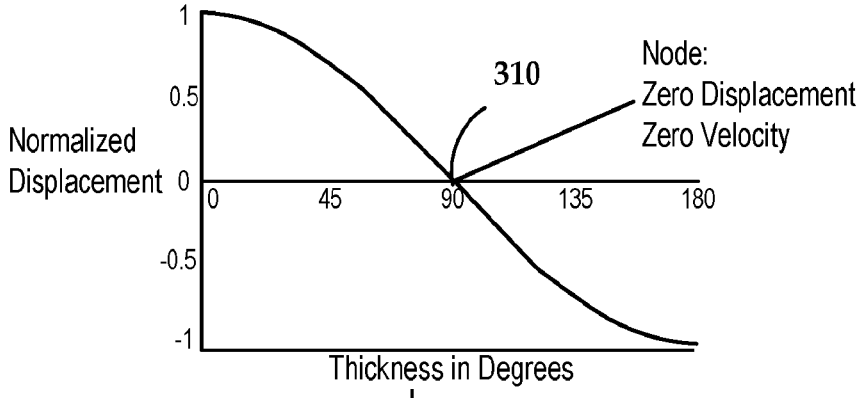
FIGS. 3A-3B show an ideal half-wave resonator in accordance with embodiments described herein.
Figure 3B:
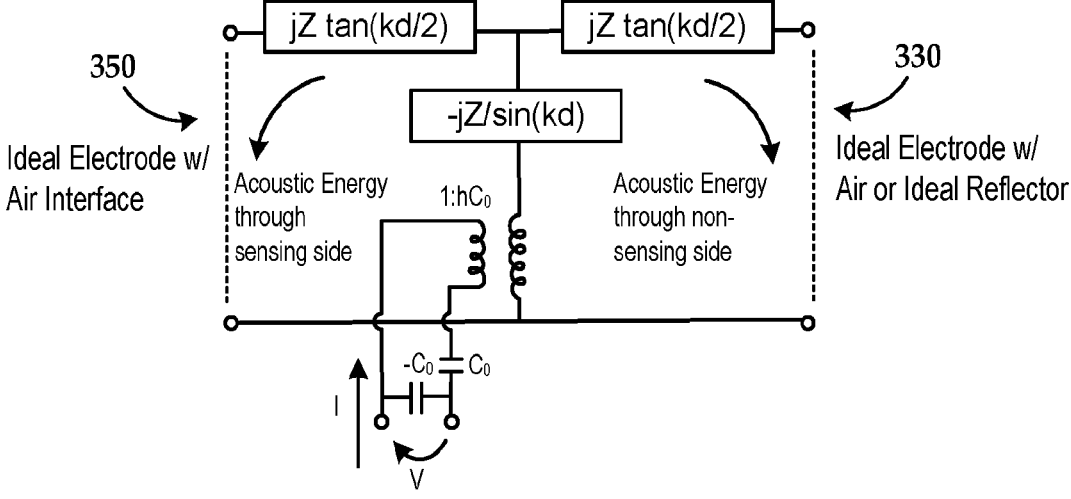

FIGS. 3A-3B show an ideal half-wave resonator. Specifically, FIG. 3A illustrates a normalized displacement wave through a half-wave resonator device. As can be observed at 90 degrees thickness 310 there is zero displacement and zero velocity. FIG. 3B shows a Mason model representation of the ideal half-wave resonator device. The first electrode 330 is disposed proximate an ideal reflector or air, and the second electrode 350 is the sensing side of the resonator and is disposed proximate air.

Embodiments described herein involve a quarter-wave resonant SMR such that the bottom electrode surface is not "free" to move, but provides no real acoustic loss. The structure under the piezoelectric is referred to as an anti-reflector as illustrated in FIG. 1. Such a device takes advantage of the symmetry provided by the anti-reflector boundary condition and mathematically, for ideal devices, they are substantially identical to half-wave resonators, but involve about half of the vibrational mass. Therefore, the quarter wave resonator devices described herein are about two times more sensitive than their half-wave counter parts. According to various configurations, the quarter wave piezoelectric material layer described herein has a thickness that represents about a quarter-period of an acoustic wave at a fundamental resonance frequency. In accordance with embodiments described herein, the quarter wave resonator structure does not need bottom electrode materials to be as critically thin as is typically necessary for high frequency half-wave devices. Devices described herein use a resonant frequency that is not a function of the layers below the piezoelectric material. This results in potentially tighter frequency windows without trim.

Figure 4A:
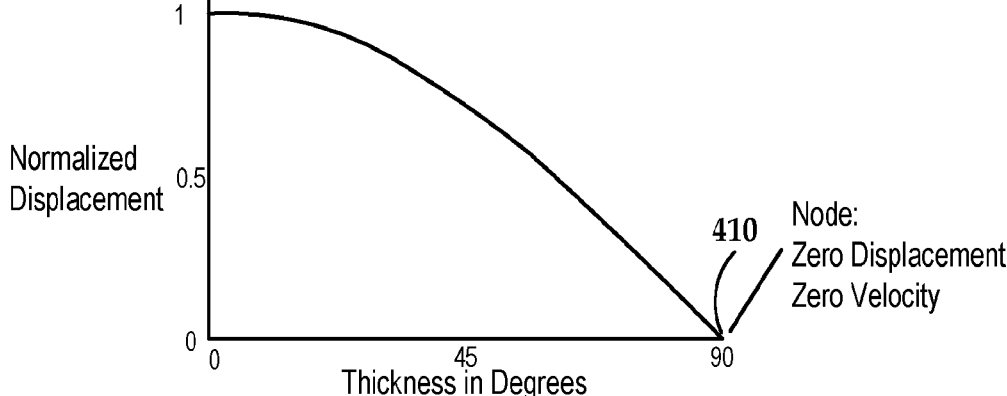
FIGS. 4A-4B show an ideal quarter-wave resonator in accordance with embodiments described herein.
Figure 4B:
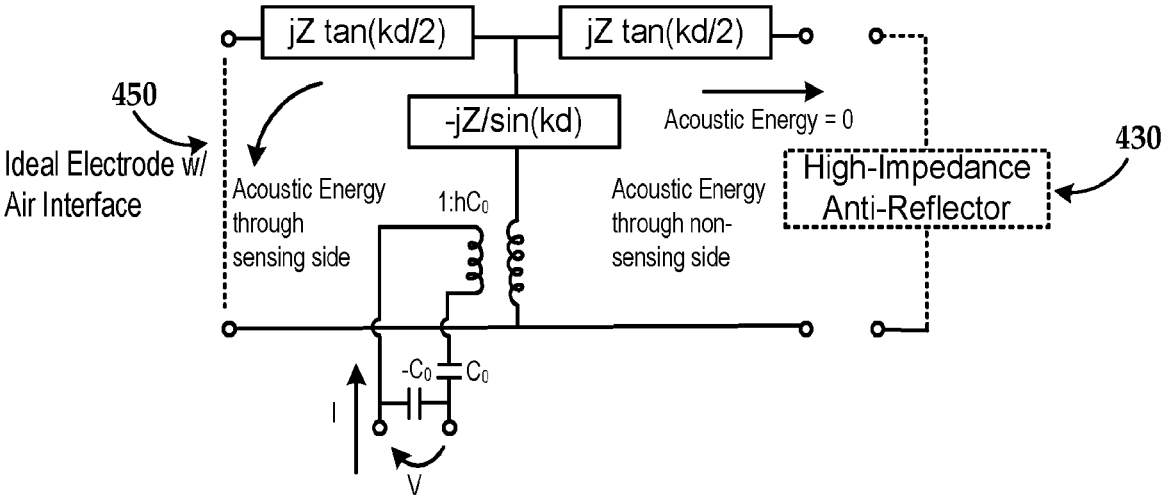

FIGS. 4A-4B show an ideal quarter-wave resonator in accordance with embodiments described herein. Specifically, FIG. 4A illustrates a normalized displacement wave through a quarter-wave resonator device. As can be observed, at 90 degrees thickness 410 there is zero displacement and zero velocity and thus is substantially identical to the half-wave device shown in FIG. 3A. FIG. 4B shows a Mason model representation of the ideal quarter-wave resonator device. The first electrode 430 is disposed proximate an a high-impedance anti-reflector, and the second electrode 450 is the sensing side of the resonator and is disposed next to air.

Input Impedance

For these ideal resonator structures, closed form solutions for the input impedance can be found by solving equations (2)-(4) (Equivalent to solving the mason model circuits of FIGS. 3B and 4B):

$$F_1 = Z_T\left(\frac{v_1}{j\tan(kd)} - \frac{v_2}{j\sin(kd)}\right) + \frac{h}{j\omega}I \tag{2}$$

-continued $$F_2 = Z_T\left(\frac{v_1}{j\sin(kd)} - \frac{v_2}{j\tan(kd)}\right) + \frac{h}{j\omega}I \tag{3}$$

$$V = \frac{h}{j\omega}(v_1 - v_2) + \frac{I}{j\omega C_0} \tag{4}$$

Figure 2:
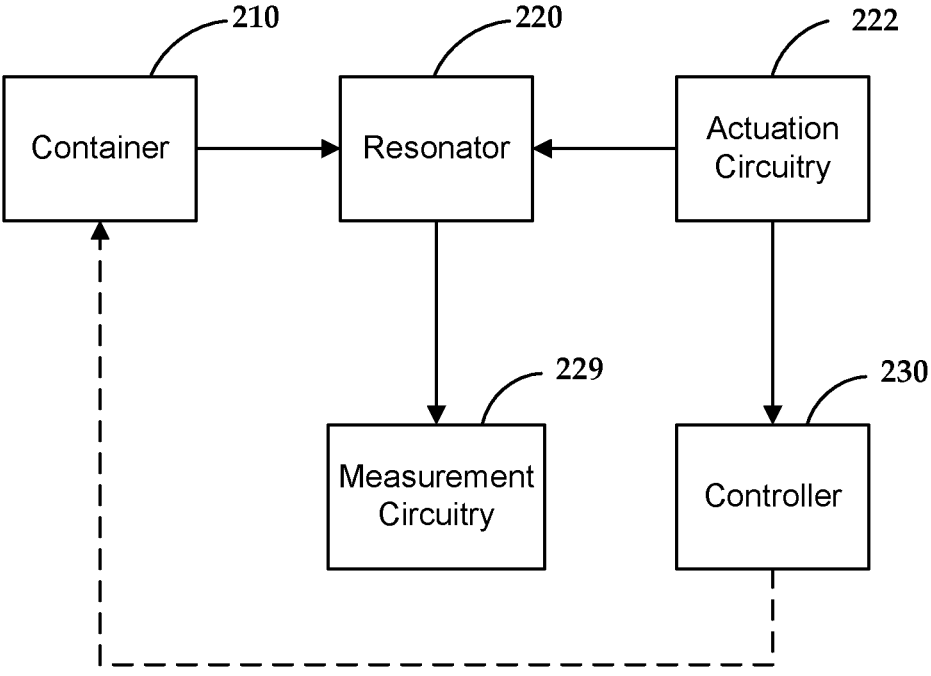
FIG. 2 is a system incorporating the resonator device in accordance with embodiments described herein.

For the quarter-wave resonator with a thickness of $d = d_{1/4}$ of FIG. 2, F1=0 (air interface) and v2=0 (high-impedance anti-reflector). Therefore, the input impedance is shown in (5).

$$Z_{in} = \frac{1}{j\omega C_0}\left(1 - \frac{k_t^2}{kd_{1/4}}\tan(kd_{1/4})\right) \tag{5}$$

This is mathematically identical to the half-wave resonator solution with a thickness of $d = d_{1/2}$ as shown in (6).

$$Z_{in} = \frac{1}{j\omega C_0}\left(1 - \frac{k_t^2}{kd_{1/2}/2}\tan(kd_{1/2}/2)\right) \tag{6}$$

given:

$$d_{1/2} = 2\, d_{1/4}$$

Mass Sensitivity

Using the approximation of Sauerbrey that mass loading can be considered an extension of the piezoelectric thickness, one can compare the frequency sensitivity of the quarter-wave resonator with that of the half-wave resonator. The parallel resonant frequency occurs at the peak of $Z_{in}$. For both cases that occurs when the tangent term sees an angle of $\pi/2$ as shown in (7)-(9).

$$\Delta m = \rho\Delta d, k = \frac{2\pi f}{V_a} \tag{7}$$

For the quarter-wave resonator:

$$f_{a_{1/4}} = \frac{V_a}{4d_{1/4}}, \frac{\Delta f}{\Delta m} = \frac{-4f_a^2}{Z_T} \tag{8}$$

And for the half-wave resonator:

$$f_{a_{1/2}} = \frac{V_a}{2d_{1/2}}, \frac{\Delta f}{\Delta m} = \frac{-2f_a^2}{Z_T} \tag{9}$$

As can be observed, the quarter-wave resonator is about twice as sensitive to loaded mass when operated at the same operating frequency of a half-wave resonator.

Rayleigh Hypothesis:

At resonance the peak kinetic energy $U_k$ substantially balances the peak potential energy $U_p$. For a mass sensor, unloaded, $U_k = U_p$. As mass is added to the sensor surface, the peak kinetic energy changes while the peak potential energy (due to the mechanical stresses) essentially remains the same. To mitigate this unbalance, the resonance frequency drops until the peak kinetic energy, again, is substantially equal to the peak potential energy. For a shear mode resonator, the peak kinetic energy can be expressed as shown in (10).

$$U_k = \frac{\omega^2}{2}\left(mass_{load}u_{x0}^2 + \rho_{piezo}\int_0^d |u_x(y)|^2 dy\right) \qquad (10)$$

In an ideal half-wave device, the displacement, $u_x(y)$, takes the form of a half period cosine function similar to FIG. 2A. Conversely for a quarter wave device, $u_x(y)$ is a quarter period cosine function. It's easily shown, $$U_{k_{1/4(unloaded)}} = \frac{U_{k_{1/2(unloaded)}}}{2} \qquad (11)$$

$$U_{k(unloaded)}(\omega_0) = U_p \qquad (12)$$

$$U_{k(1/2)(loaded)}(\omega) = \frac{\omega^2 u_{x0}^2}{2}\left(mass_{load} + \frac{mass_{1/2}}{2}\right) = \frac{\omega_0^2 u_{x0}^2}{2}\left(\frac{mass_{1/2}}{2}\right) \qquad (13)$$

The maximum displacement $U_{x0}$ falls out and upon linearizing, this results in the same equation for frequency shift as shown previously in (1).

Since the peak unloaded kinetic energy of the quarter-wave resonator is substantially half of the half-wave resonator, the same relation holds true for the quarter-wave resonator. This results in a mass sensitivity of substantially twice that of the half-wave resonator.

Figure 5:
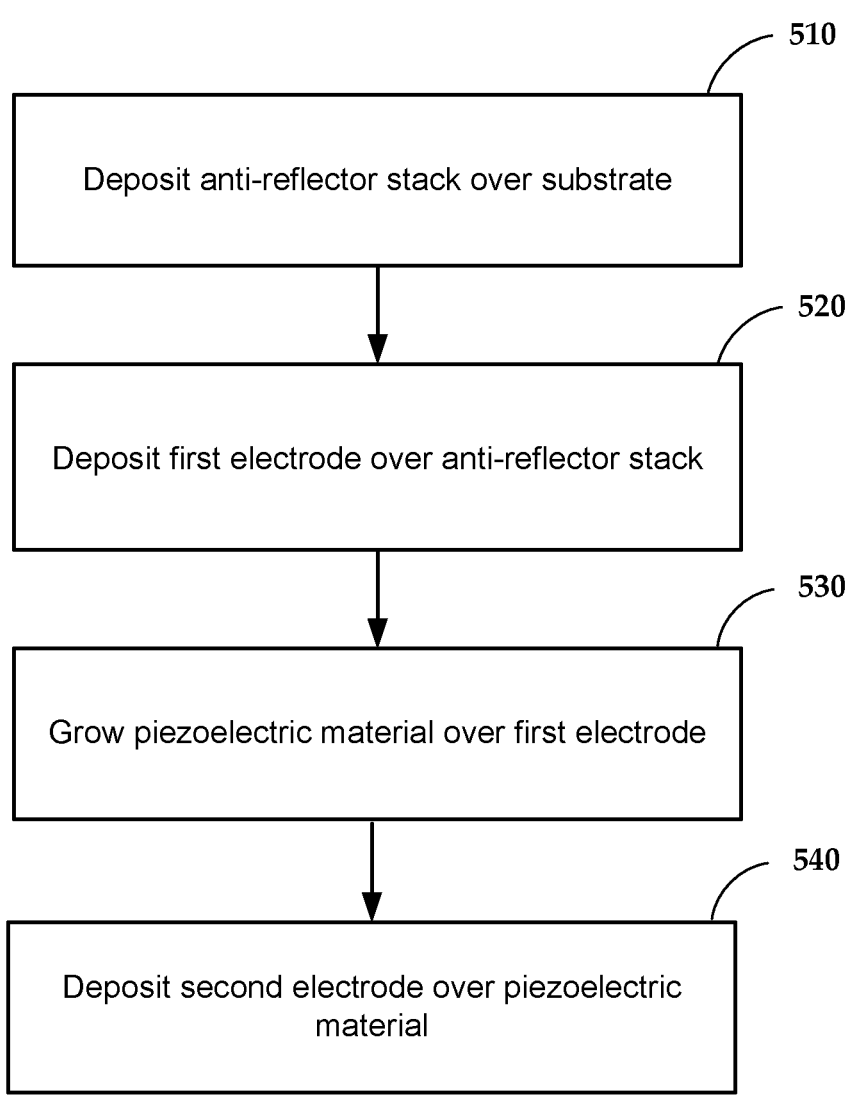
FIG. 5 illustrates a process for making a quarter-wave resonator structure for mass sensing in accordance with embodiments described herein.

FIG. 5 shows a method of making a quarter-wave resonator structure for mass sensing in accordance with embodiments described herein. An anti-reflector stack is deposited 510 over a substrate. The first electrode is deposited 520 on the anti-reflector. In some cases, the first electrode is incorporated into the anti-reflector stack. A substantially quarter wave piezoelectric material is grown 530 over the first electrode. The second electrode is deposited 540 over the piezoelectric material.

Illustrative embodiments are described and reference has been made to possible variations of the same. These and other variations, combinations, and modifications will be apparent to those skilled in the art, and it should be understood that the claims are not limited to the illustrative embodiments set forth herein.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to." It will be understood that "consisting essentially of" "consisting of" and the like are subsumed in "comprising" and the like. As used herein, "consisting essentially of," as it relates to a composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Any direction referred to herein, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

What is claimed is:

1. A solid mount resonator sensor, comprising:
a substrate;
an anti-reflector stack disposed proximate the substrate, the anti-reflector stack comprising one or more acoustic interference layers;
an active region, comprising;
a first electrode disposed proximate and incorporated into the anti-reflector stack;
a second electrode having a first surface facing towards the first electrode and an opposing second surface facing away from the first electrode;
a quarter-wave piezoelectric material layer disposed between the first and second electrodes; and
a functionalization material arranged over the active region;
wherein the anti-reflector stack causes substantially no dampening at a fundamental resonance frequency and causes little or no acoustic energy to be delivered to a non-sensing side of the solid mount resonator sensor.

2. The solid mount resonator sensor of claim 1, wherein the quarter wave piezoelectric material layer has a thickness that represents a quarter-period of an acoustic wave at a fundamental resonance frequency.

3. The solid mount resonator sensor of claim 1, further comprising actuation circuitry configured to drive the solid mount resonator sensor into an oscillating motion.

4. The solid mount resonator sensor of claim 3, wherein the actuation circuitry is configured to drive the solid mount resonator sensor into one or more of a longitudinal mode and a shear mode.

5. The solid mount resonator sensor of claim 1, wherein an acoustic reflectivity of the anti-reflector stack is zero.

6. The solid mount resonator sensor of claim 1, wherein a mass sensitivity of the solid mount resonator sensor is twice a mass sensitivity of a half-wave resonator sensor when operating at the same frequency.

7. The solid mount resonator sensor of claim 1, wherein a design frequency of operation is in a range of 2 GHz to 10 GHz.

8. The solid mount resonator sensor of claim 1, wherein the functionalization material comprises a specific or a non-specific binding material.

9. A resonator sensor system comprising:
a solid mount resonator comprising:
  a substrate;
  an anti-reflector stack disposed proximate the substrate, the anti-reflector stack comprising one or more acoustic interference layers;
  an active region, comprising;
    a first electrode disposed proximate and incorporated into the anti-reflector stack;
    a second electrode having a first surface facing towards the first electrode and an opposing second surface facing away from the first electrode; and
    a quarter-wave piezoelectric material layer disposed between the first and second electrodes; and
  a functionalization material arranged over the active region;
actuation circuitry configured to drive the solid mount resonator into an oscillating motion;
measurement circuitry configured to measure one or more resonator output signals representing a resonance characteristic of the oscillating motion of the solid mount resonator; and
a controller operatively coupled to the actuation circuitry and the measurement circuitry;
wherein the anti-reflector stack causes substantially no dampening at a fundamental resonance frequency and causes little or no acoustic energy to be delivered to a non-sensing side of the solid mount resonator.

10. The resonator sensor system of claim 9, wherein the quarter wave piezoelectric material layer has a thickness that represents a quarter-period of an acoustic wave at a fundamental resonance frequency.

11. The resonator sensor system of claim 9, wherein an acoustic reflectivity of the anti-reflector stack is zero.

12. The resonator sensor system of claim 9, wherein a mass sensitivity of the solid mount resonator sensor is twice a mass sensitivity of a half-wave resonator sensor when operating at the same frequency.

13. The resonator sensor system of claim 9, wherein a design frequency of operation is in a range of 2 GHz to 10 GHz.

14. The solid mount resonator sensor of claim 9, wherein the functionalization material comprises a specific or a non-specific binding material.

15. A solid mount resonator sensor, comprising:
a substrate;
an anti-reflector stack disposed proximate the substrate, the anti-reflector stack comprising:
  one or more acoustic interference layers;
an active region, comprising;
  a first electrode incorporated into the anti-reflector stack;
  a second electrode having a first surface facing towards the first electrode and an opposing second surface facing away from the first electrode; and
  a quarter-wave piezoelectric material layer disposed between the first and second electrodes; and
a functionalization material arranged over the active region;
wherein the anti-reflector stack causes substantially no dampening at a fundamental resonance frequency and causes little or no acoustic energy to be delivered to a non-sensing side of the solid mount resonator sensor.

16. The solid mount resonator sensor of claim 15, wherein the quarter wave piezoelectric material layer has a thickness that represents a quarter-period of an acoustic wave at a fundamental resonance frequency.

17. The solid mount resonator sensor of claim 15, further comprising actuation circuitry configured to drive the solid mount resonator sensor into an oscillating motion.

18. The solid mount resonator sensor of claim 17, wherein the actuation circuitry is configured to drive the solid mount resonator sensor into one or more of a longitudinal mode and a shear mode.

19. The solid mount resonator sensor of claim 15, wherein an acoustic reflectivity of the anti-reflector stack is zero.

20. The solid mount resonator sensor of claim 15, wherein a mass sensitivity of the solid mount resonator sensor is twice a mass sensitivity of a half-wave resonator sensor when operating at the same frequency.

21. The solid mount resonator sensor of claim 15, wherein a design frequency of operation is in a range of 2 GHz to 10 GHz.

22. The solid mount resonator sensor of claim 15, wherein the functionalization material comprises a specific or a non-specific binding material.

* * * * *